(No Model.)

H. WATERMAN.
LOCOMOTIVE.

No. 262,163. Patented Aug. 1, 1882.

WITNESSES
Wm. A. Skinkle.
Ernest Abshagen.

INVENTOR
Henry Waterman
By his Attorneys Holloway & Blanshard

United States Patent Office.

HENRY WATERMAN, OF HUDSON, NEW YORK.

LOCOMOTIVE.

SPECIFICATION forming part of Letters Patent No. 262,163, dated August 1, 1882.

Application filed October 28, 1881. (No model.)

*To all whom it may concern:*

Be it known that I, HENRY WATERMAN, a citizen of the United States, residing at Hudson, in the county of Columbia and State of New York, have invented certain new and useful Improvements in Locomotive-Engines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in locomotive-engines; and the object of my improvement is to increase or diminish the adhesive power of the driving-wheels thereof in a direct and positive manner and place the control of it within the immediate and easy reach of the person in charge. I attain this object by the mechanism illustrated in the accompanying drawings, in which—

Figure 1 represents so much of an engine and tender as is necessary to illustrate my invention in one of its forms and its application, the parts being shown in position for operation. Fig. 2 represents a modification of the parts constituting my improvement shown in Fig. 1, it consisting in substituting a bell-crank lever for the links shown in said figure. Fig. 3 is a diagram, showing the wheels and frame of an ordinary locomotive, designed to show how the downward force applied to the rear end of the frame of an engine will be augmented by the weight of the forward end or by the tendency to raise that end. Fig. 4 is a detached sectional view, showing in cross-section the system of links, and the stud and their attachments shown in elevation in Fig. 1. Fig. 5 shows the same parts when the links and the stud are in a central position. Figs. 6 and 7 show a side and cross section of a modification designed to be used when a direct action of the parts is desired, and Fig. 8 is a sectional elevation of a water-trap or escape-valve to be placed on the cylinder for the purpose of relieving it of the water of condensation.

Similar letters refer to similar parts throughout the several views.

Since the introduction of steel rails and steel tires of driving-wheels the ordinary locomotive-engine has suffered a considerable loss of adhesion, owing, no doubt, to the superior hardness of the surfaces in contact. Engineers have been loth to restore this loss by the addition of permanent weight to their engines, for the reason that the portions of their lines that require the additional adhesion bear but a small proportion to the whole, and that as a general thing trains upon the portions that require the additional adhesion are run at a lower rate of speed than are those upon the portions which do not require it; and, as it is well known that the higher rate of speed does the most damage to both machinery and track with the same weight of engine, it is desirable to have the weight upon the driving-wheels as light as possible without detracting from the efficiency of the engine when running at high speed. I obtain additional weight upon the driving-wheels, and consequently additional adhesion, by transferring a part of the weight of the front end of the tender to the rear end of the locomotive engine by suitable mechanism, as will be fully described hereinafter. In order to distinguish my method of accomplishing this result from others that have been used practically, I will give a description, as far as my knowledge extends, of those that have been previously used.

As early as the year 1837 locomotive-engines were in use in which the front end of the tender was made to bear upon the rear end of the engine. This was effected by means of a screw which passed through the rear of the foot-board into the back end of the draw-bar that connected the engine with the tender, so that when the screw was turned it would force the front end of the tender upward and communicate a corresponding force downward upon the rear of the engine. These locomotive-engines had but a single pair of driving-wheels. Wedges and blocks have been used in place of the screws above mentioned. Again, draw-bars have been used placed at a considerable angle—that is to say, with the front end considerably higher than the back end, so that when a pulling force is applied to it it will lift the front of tender and press downward upon the engine. This force will be in degree in accordance with the degree of angle of the bar and amount of pull.

The lifting of the tender by means of screws or equivalent devices is defective and impracticable for the following reasons: It communicates its force in a permanent manner, and is used to as great an extent upon a level grade, where it is not required, (in proportion to the draft of the engine,) as it is in ascending grades, where it is required, and does not provide for the great variation of weights that occur in practice. For instance, when the tender is loaded with fuel and water it is vastly heavier than when this load is removed. The weight of the fuel and water is generally considered to be about equal to the weight of the tender itself, so that a permanent connection would vary in force about from minimum to one hundred per cent.

The use of the angular draw-bar for the purpose of adding to the weight upon the driving-wheels is in practice defective for the following reasons: It is not of a positive character and must depend upon the degree of adhesion pre-existing. For instance, if the wheels have commenced to slip, they will glaze their surfaces, and thereby lose from thirty to thirty-five per cent. of their adhesion, which the angular bar cannot restore. Again, the angular bar is not in the least degree operative when the motion of the engine is reversed, for when the angular bar is used for the backward motion it will produce a positive loss of adhesion, as it pushes down upon the tender and up upon the engine; and as the sand-boxes and sand-pipes are not placed in the rear of the driving-wheels, when the engine is called upon to exert all of its available force to back up the train neither the angular bar nor the sand can assist, the former being a positive damage.

It is an important feature of my invention that it can be applied in anticipation of the immediate want of additional adhesion, which will tend to prevent the slipping and the glazing of wheels, so that the greatest amount of adhesion can be attained.

My method of applying additional weight or downward force to the driving-wheels of a locomotive-engine at the required times and in the degrees required is accomplished by attaching a steam-cylinder to the boiler, or to the frame of the engine beneath the foot-board or floor of the cab, or to the frame of the tender beneath the floor thereof, and connecting this cylinder to the steam-chamber of the boiler by means of a pipe with a stop-cock or valve placed therein and within easy reach of the person in charge. This cylinder, when in action, may be charged with steam from the boiler, or it may be connected by a pipe to the air-chamber used in connection with air-brakes, to be charged with the pressure of the compressed air contained therein, it having a piston or plunger and a connecting-rod that connects it with a system of links, studs, and their joints, so arranged that the steam or compressed air will communicate an upward force to the front of the tender and a downward force to the rear of the engine, and, through the frame of the engine, an additional force to the driving-wheels, such force being augmented by the rising or tendency to rise of the front end of the engine, this downward force upon the driving-wheels being positive and entirely independent of the pull or push of the engine upon the draw-bar or other parts.

It is important that the point where the weight is applied at the rear of the engine should be as near the back end of the frame as possible, so that the augmented downward force shall be as great as possible. By referring to Fig. 3 it will be seen that, if the distance between $e$ and $p$ is one-half the distance between $p$ and $r$, each pound placed upon $e$ will produce a downward force of one and a half pound upon $p$ and an upward force of half a pound at $r$.

My invention is specially or best adapted to what is called the "eight-wheel" engine, having two pairs of driving-wheels at the rear and two pairs of common wheels at the front, although it can be used, though at a less advantage, on the six-wheel engine.

It will be observed that there are several modifications of my invention shown, all, however, embodying the same principles of action and producing the same result. The crudest form is shown in Figs. 6 and 7, in which the cylinder is suspended to the back cross-bar of the frame of the engine. This cylinder is so placed that by means of the piston $a'$, which has a joint in it sufficiently free, the stud $fg$ is allowed to vibrate with the vibration of the tender. The stud $fg$ is a direct connection between the piston and the back end of the draw-bar, so that the upward force will be communicated to the draw-bar and from it to the front end of the tender. If the cylinder is carried farther back, the stud may be made to bear upward against a shoe piece, like $k$, Fig. 1.

The modification shown in Fig. 2 consists in substituting a lever or bell-crank in place of the links and stud. This form is in its action the same as that shown in Fig. 1. This lever may be changed by placing the long end horizontally and applying a cylinder and piston, acting vertically upon its long end; or the amount of weight transferred to the engine by the hand of the engineer or fireman may be effected by means of a series of cranks, links, and rods, arranged substantially as shown in said figure.

In constructing and applying my improvements to a locomotive I employ, when steam is used as the motive power, a cylinder, $a$, of such dimensions as may be required, and by preference attach it to the boiler under the foot-board of the engine, as when it is placed in such position the heat from said boiler has the effect to prevent the water of condensation from becoming frozen therein. Within the cylinder $a$ there is placed a piston or plunger, $a'$, the former being preferred on account of its being more readily packed, which is forced outward by means of steam admitted between it and the head of the cylinder through the steam-pipe $a^2$, the upper end of which is connected with a cock or valve, $m$, which communicates with the steam-space of the boiler, it being supplied with a supplemental valve, $n$, through which oil may be introduced for lubricating the piston $a'$.

For the purpose of communicating the movements of the piston to the mechanism which applies a portion of the weight of the tender to the engine, there is connected to said piston or plunger a connecting-rod, $c$, the opposite end of which is connected to two swinging rods or links, $d\ d$, and to a jointed stud, consisting of the parts $f$ and $g$, the upper end of which is in this instance secured to a bracket, $k$, attached to the frame-work of the tender, to which bracket the stud is pivoted in such a manner as to permit it to swing thereon. The upper ends of the links $d\ d$, above referred to, extend upward from their pivotal points $h$ to brackets $e$, or to a single one which is firmly bolted to the rear end of the frame A of the engine, they being pivoted to said bracket or brackets so that their lower ends may swing freely as the piston $a'$ moves in its cylinder.

The arrangement of the above-named parts is such that as steam or compressed air is admitted into the inner end of cylinder $a$ the piston or plunger $a'$ will be forced outward and cause the connecting-rod $c$ to be moved rearward, the effect of which will be to press upward upon the stud, and through it upon the forward end of the tender, a portion of the weight of which will be transferred through the links $d\ d$ to the rear end of the engine and through its frame to the driving-wheels.

It will be observed that the amount of weight transferred, as just stated, will be in proportion to the distance the piston is made to travel in the cylinder up to the time when the weight of the front end of the tender is carried by the engine, or up to the time when the stud $f\ g$ reaches a vertical position; and it follows as a consequence of this arrangement that the amount of weight or force thus transferred may at all times be regulated by the operator and by the amount of steam or air admitted to the cylinder. It is also apparent that the augmentation of the direct weight or force that is applied to the rear end of the engine will be in proportion to that thus applied, its action being clearly shown by the diagram herewith presented. I desire it to be understood, however, that I do not confine myself to the particular construction or arrangement of parts shown in the drawings, as such parts may be modified in form and arrangement without in the least departing from my invention.

When it is found desirable to use compressed air only for causing the requisite movement of the piston or plunger $a'$, I contemplate placing the cylinder under the floor of the tender, such an arrangement being shown in Fig. 1. The only change required in order that it may be so placed is the provision of the necessary frame-work for supporting it in position, the operation of all the other parts being the same whether pushed into operation by the rod C or drawn by said rod, as in the case under consideration.

The modification shown in Fig. 2 is the same in principle as that shown in Fig. 1, the difference in construction consisting in the use of a bell-crank lever, $i$, for transferring the weight to the engine, in place of the stud $f\ g$.

The transverse sections shown in Figs. 4 and 5 are designed to illustrate the provision which is made for the oscillation of the tender upon the track, Fig. 4 showing the stud in an inclined position, such as it assumes when the center of the tender is not in line with the center line of the engine, and Fig. 5 showing it in a vertical position.

The modifications show a plan for attaching the cylinders directly to the frame of the tender, in which case the steam or air cylinders are placed vertically, they being provided with pistons and rods, the latter constituting the portion $f$ of the stud $f\ g$. The construction of this stud is as follows: The part $g$ consists of a socket the upper end of which is attached to a bracket or a shoe-piece, $k$, secured to the frame of the tender, while the part $f$ consists of a rod the lower end of which is secured to and held in position by the links $d\ d$ or by ears formed on the pistons $a'$. The construction and arrangement of this device is such that when the tender is loaded and the apparatus is not in use the upper end of the part $f$ is forced up to the upper end of the cavity in the part $g$, at which time they together form a thrusting-rod, when the motion of the tender vertically will in moving downward force the part $f$ down, which will have the effect to cause all of the parts, including the piston in the cylinder, to be carried into a proper position for use.

When the construction and arrangement of the parts illustrated in Figs. 6 and 7 are used there is provided a shoe-piece, $k$, to which the upper end of the stud $f\ g$ is secured by means of a bolt which forms a joint for the stud to work upon, the shoe-piece being provided with a series of holes for the bolt to enter, by which means the degree of downward pressure or force can be regulated to any extent desired, as the stud in this case receives the thrust directly upon its upper end, and it follows that when it is placed at a greater or less elevation its action upon the tender will be controlled by its position.

The device shown in Fig. 8, as above stated, is a relief-valve or water-trap, it consisting of a tube, E, the upper end of which is provided with a screw-thread for securing it to the cylinder, with the interior of which it communicates. Said upper end is also provided with a valve, F, which opens inward, it being provided with a stem which enters an aperture formed in the tube, its lower end resting upon a spring, H, placed in the lower end of the tube. For the purpose of regulating the action of this valve, there is placed in the extreme lower end of the tube E a hollow set-screw, G, upon which the lower end of spring H rests. In practice the screw G is turned upward to such an extent that it will require, say, eighty or ninety pounds pressure in the cylinder to open it, said pressure serving to keep the valve closed so long as the apparatus is in use, it being opened by the spring when the steam is shut off, said opening affording means for the escape of the water of condensation.

Having thus described my invention, what I claim, and desire to secure by Letters Patent, is—

1. The hereinbefore-described method of placing upon the driving-wheels of a locomotive an amount of weight not due to the weight of the engine, it consisting in combining with the frame of the engine and the tender a cylinder and piston, a connecting-rod, pivoted oscillating links, a supporting vibratory stud, and a shoe-piece for supporting the upper end of said stud, substantially as set forth, and for the purpose described.

2. The combination of the frame A of the engine, the brackets $c$, links $d\ d$, the elongating vibratory stud $f\ g$, a shoe-piece, $k$, having different holes or joints for connecting it with the upper end of the stud, a piston-rod, $c$, steam or air cylinder $a$, and piston $a'$, the parts being arranged for joint operation substantially as set forth.

3. The vibratory supporting-stud $f\ g$, constructed and arranged substantially as shown and described, whereby it is made to aid in transferring a portion of the weight of the tender to the driving-wheels of the engine, and in returning the parts to their proper positions for reapplication by the admission of steam or compressed air to the cylinder $a$, substantially as set forth and described.

4. The shoe-piece $k$, constructed as shown, it having a series of holes or joints for regulating in different degrees the amount of weight to be placed upon the engine, substantially as set forth.

5. The pivoted oscillating links $d\ d$, in combination with the rear cross-bar of the frame of an engine, their upper ends being arranged at such a distance from each other as to allow the free vibration of a draw-bar between them, and their lower ends so near to each other as to form a central point upon which a portion of the weight of the tender may rest, substantially as shown.

In testimony whereof I affix my signature in presence of two witnesses.

HENRY WATERMAN.

Witnesses:
C. M. CONNELL,
G. W. BALLOCH.